Inventors.
Edmond P. DeCraene,
Richard Fennema, &
Francis J. Cantalupo.
By Joseph O. Lange Atty.

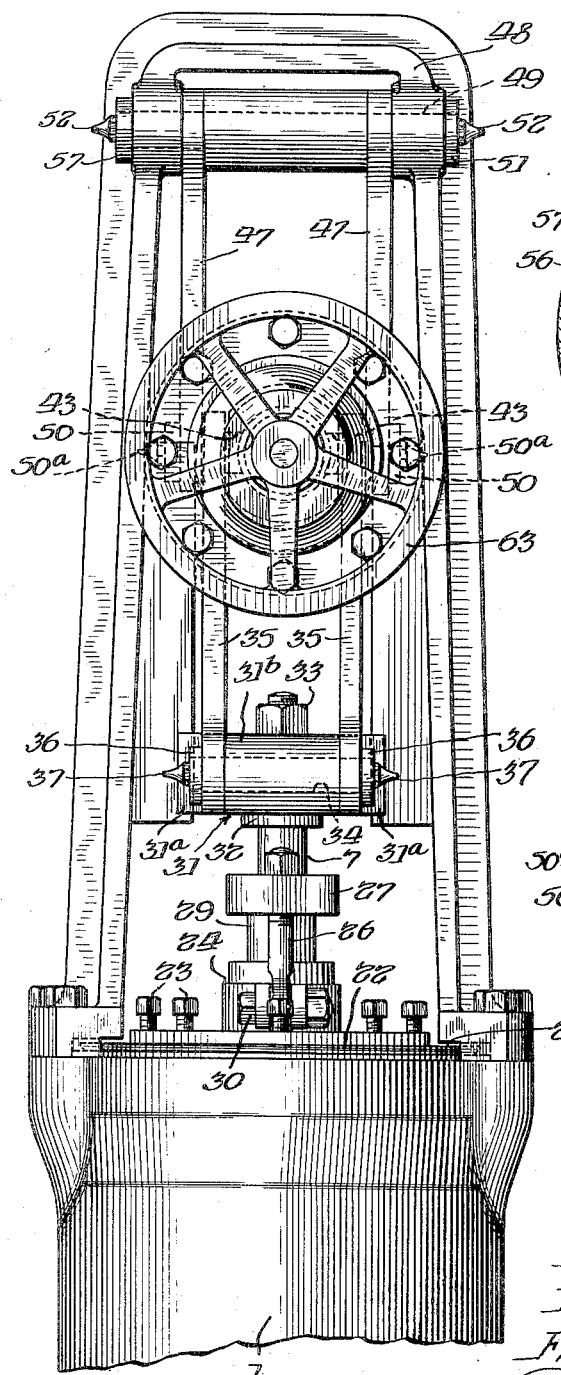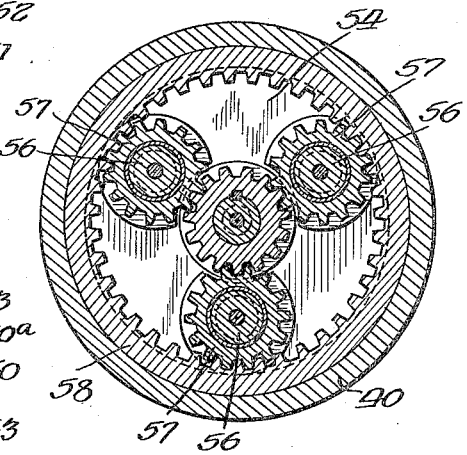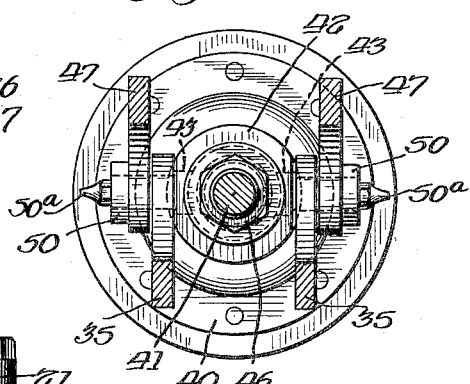

Patented July 18, 1950

2,515,498

UNITED STATES PATENT OFFICE 2,515,498

TOGGLE OPERATING MECHANISM FOR VALVES

Edmond P. De Craene, Westchester, and Richard Fennema and Francis J. Cantalupo, Chicago, Ill., assignors to Crane Co., Chicago, Ill., a corporation of Illinois Application July 16, 1945, Serial No. 605,326

8 Claims. (Cl. 74—520)

Broadly this invention relates to a valve actuating means and more particularly it pertains to a novel toggle operated mechanism for valves or the like.

At the outset, in order to acquire a true appreciation of the background of this invention, it should be understood that it is desirable in connection with gate valves, for example, to provide a high lift in operating such valves. The type of mechanism forming the subject matter of this invention permits such high lift in gate valves or other valves without the employment of excessively long toggle links heretofore used in connection with such mechanisms.

Another important object is to provide a mechanism which permits a faster operation than the conventional toggle design heretofore available and yet at the same time providing desirable mechanical advantages in permitting substantial lifting power.

Heretofore in toggle operating mechanisms the serious trouble experienced has been the tendency for the toggle yokes to tilt and to cause objectionable binding of the operating stem threads. In the current novel design, the mechanism is more efficient than the conventional toggle design by eliminating the objectionable tendencies as above referred to.

A further mechanical advantage obtained lies in the new and substantial guiding of the crosshead to prevent straining and bending of the valve stem and this is accomplished without the use of eccentric pins for adjustment such as was found necessary in the previous design employed for the purpose.

A further object is to provide an actuating mechanism in which the rigid connection of the links to the upper portion of the yoke serves to align the mechanism so that the valve stem itself it not depended upon for that purpose as is usual in this type of construction.

A further object is to provide a construction in which planetary gearing may be employed in combination therewith and whereby the size and weight of the actuating mechanism is thereby materially reduced.

An additional advantage lies in the employment of an operating assembly which is simplified so that the need for any adjustment to align the stem properly is deemed to be unnecessary.

A still further object lies in the employment of a substantially shorter threaded toggle stem proportioned to provide the same lift as heretofore accomplished by the longer threads of a conventional design.

Another object is to provide a construction which is equally applicable to globe and angle valves as well as to gate valves and to which the several advantages above enumerated also apply to these types of valves.

Other objects and advantages will become apparent upon proceeding with the following specification read in light of the accompanying drawings, in which Fig. 1 is a fragmentary sectional assembly view of the actuating mechanism applied to a gate valve.

Fig. 2 is an end view of the construction described in connection with Fig. 1 viewed from the handwheel and motor side.

Fig. 4 is a section taken on the line 4—4 of the planetary gearing shown in Fig. 1.

Fig. 5 is a section taken on the line 5—5 of Fig. 3 showing the toggle mechanism in collapsed position.

Similar reference characters refer to similar parts throughout the several views.

Figure 1:
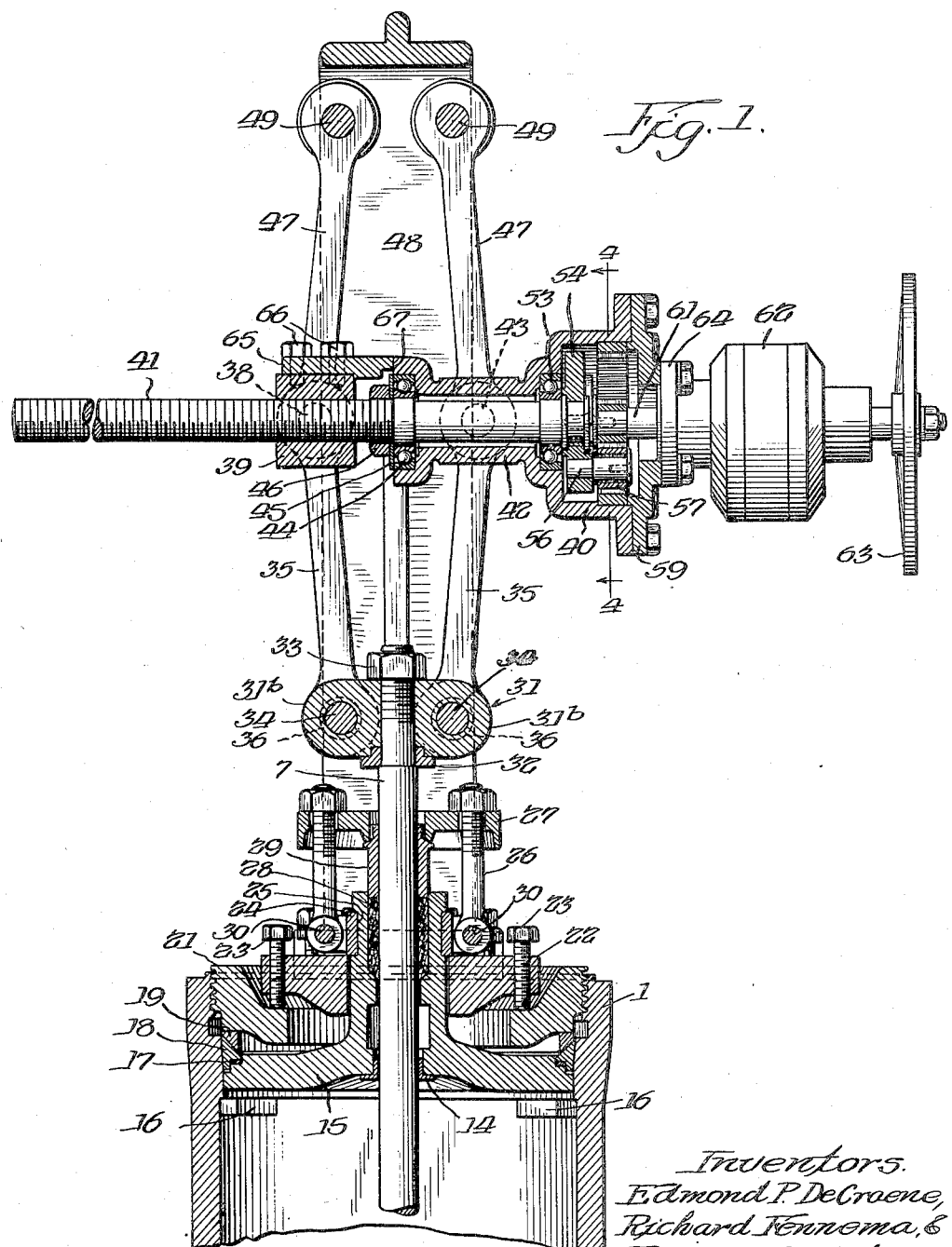

Referring to the drawings, a conventional gate valve is shown which is of the flange type having a casing 1, the end connections 2 and provided with the usual valve seat 3 for suitable contact by the valve disc portions 4, the latter being held in spaced-apart relation by means of the spring 5 and a spring washer 6 bearing against the back or rear portion of the discs 4 as indicated, the stem 7 being attached to the enlarged end extension 8 by means of the threads 9 and the pin 10. A disc retaining collar 11 with a disc retainer 12 is employed to hold the assembly together and is preferably of annular configuration with the extension 8 preferably integral therewith. When the valve is open, as in Fig. 3, it will thus be apparent that the surface 13 contacts with the undersurface portion of the bonnet as at 14. The upper portion of the casing is provided with a mounting for a pressure sealed joint similar to that covered in our pending application Serial No. 589,118, filed April 19, 1945, now Patent No. 3,428,963, in which the bonnet 15, as shown in Fig. 1, normally rests upon the lugs 16 when being installed in the casing 1. The bonnet has a reduced upper portion, as indicated, upon which the gasket 17 preferably of the spiral wound asbestos type is mounted, including a retaining ring gasket 18 of generally annular form and having a tapered peripheral surface positioned over the first named gasket 17. A steel follower ring 19 bears against an inner annular tapered portion, as shown. The retaining ring is preferably threadedly mounted, as shown, the ring bearing the designation 21, and abuts against the upper surface portion of the follower ring 19, as indicated. A bonnet collar 22 is fitted over the neck portion of the bonnet, as shown, the bonnet collar being provided with a number of cap screws 23 annularly arranged and which bear against the upper surface of the retaining ring 21, as shown. After positioning the bonnet collar 21 around the bonnet and tightening the cap screws 23 against the retaining member 21, the bonnet collar is shouldered against the split collar 24. The latter member fits snugly within the annular groove or recess 25 and when bolted together also serves as a mounting for the gland eye bolts 26 pivotally mounted as at 30. The latter members 26, being suitably threaded, as indicated, engage the gland flange 27, to compress the packing 28 by means of the gland 29.

For purpose of actuating the stem 7 reciprocably, the upper end portion of the stem is provided with a threaded length as indicated around which the crosshead 31 is suitably positioned, resting upon the washer 32, the crosshead being held in place by means of the nut 33 threaded on a reduced portion of the stem.

As clearly shown, the end of the crosshead 31 is provided with a pair of guide embracing ribs 31a. At 90° to the guides 31a the crosshead has trunnions 31b for reception of the stud shaft 34 over which the toggle links 35 are fitted, the nut 33 being used to retain such assembly in place on the valve stem 7. The links are held in position on the studs 34 by means of the collars 36 at the end of which a lubricating fitting may be provided as indicated at 37.

At the upper end portion of the toggle links 35, one of the latter is mounted for journaling engagement with the projecting stud 38 integral with the threaded block 39, the latter member being threaded, as will hereinafter be explained in more detail, to receive the horizontally extending threaded toggle stem 41. The other connecting link 35, similarly connected to the integral stud 43 of the planetary gear housing 40 provided with the reduced neck portion 42, the latter portion having an end recess 44 to receive the ball bearing 45, the bearing being held in place by means of a threaded retaining nut and washer assembly 46. Similarly positioned upon the integral studs 38 and 43 are the upper toggle links 47, the latter members being journally mounted at their upper portion as indicated within the yoke 48 by means of a pair of pins 49, the latter members being held in position by the locking collars 51 and preferably having the lubricant fittings 52, the yoke being provided with suitable pads to provide such support.

Figure 3:
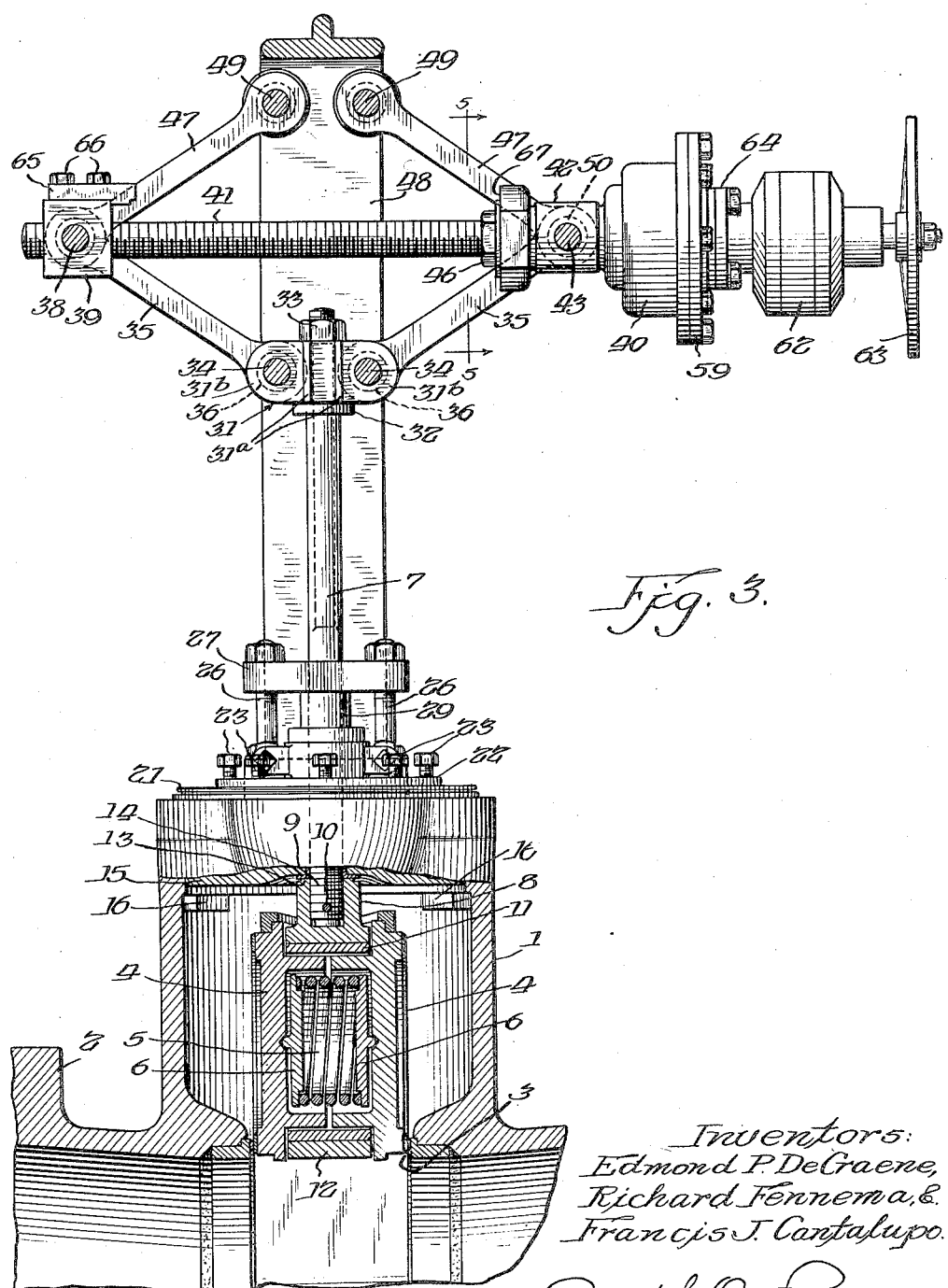
Fig. 3 is the same view as in Fig. 1 except with the valve in open position.

For purpose of actuating the toggle stem 41 rotatably, the planetary gear housing 40 is provided with the reduced extension 42 which carries on its sides the locking collars and the lubricating fittings 50a, as indicated, thereby accommodating within the recess the ball bearing 53. The stem has non-rotatably attached thereto, as indicated, the spider 54, the latter member, as shown in Fig. 3, having suitable apertures 55 receiving the shafts 56 on which the conventional planetary gears 57 are mounted for cooperation therewith upon suitable actuation by the orbit gear 58. The latter gear is press fitted within the casing 40 and is further held in position by means of the bolted cap 59. A preferred arrangement of the orbit and planetary gearing in plan is shown in the sectional view of Fig. 4. The shaft 61 may be driven either by means of a fluid or electric motor 62 or else by means of a handwheel suitably connected to the shaft as indicated at 63. The motor 62 is bolted to the flange 64 which is suitably attached non-rotatably to the cap 59, as indicated.

In connection with the use of a paralleled seated valve, it may be desirable to have a stop between the threaded block 39 and the member 42 to limit the closing movement of the valve. This is accomplished by having a bolted extension 65 serving as a stop plate and bolted by means of the bolts 66 to the upper surface of the threaded block 39. In limiting the link movement in the closing direction, the stop plate 65 thus abuts against an end surface 67 on the body extension 42, as indicated, when the valve is in the closed or seated position.

In actual operation, depending upon the direction of rotation of the motor 62 or the handwheel 63, the threaded block 39 will travel outwardly or inwardly upon the threads of the toggle stem 41, thus causing a movement of the toggle in the general direction indicated in Figs. 1 and 3. It is of course understood that the threaded block 39 and the member 43 will be separated or spread apart as indicated more clearly by the respective position of the studs 38 and 42. The stop plate 65 need not necessarily be employed in such cases in which a valve seat with a tapered disc or closure member is employed, since the valve disc by virtue of the taper comes to a definite stop, which is not true of course of the type of valve illustrated herein.

Of course the numerous details of construction described may be varied throughout a wide range of equivalents without departing from the principles disclosed herein. It is therefore not proposed to limit the patent claims granted hereon otherwise than as necessitated by the prior art.

We claim:

1. A toggle-operated device comprising in combination a casing having a stem reciprocably guided therein, means of rotation therefor, a yoke for support of said rotating means, a transversely extending rotatable shaft threaded at one end and adapted to be connected to said means of rotation, a housing for said means of rotation, an apertured block at the threaded end of the said shaft, said shaft being rotatably mounted within said apertured block and said housing, the said block being internally threaded to cooperate with the threaded portion of said shaft, the said housing being mounted to enclose the opposite end portion of said shaft so as to permit relative rotation but to restrain relative axial movement between said shaft and the said housing, a crosshead member secured to said stem, a pair of arms journaled on said block and said housing in pivotal engagement with the crosshead member, a pair of supporting arms journaled on the said block and housing and pivotally mounted on said yoke.

2. In a toggle mechanism of the character described for assembly with a reciprocably movable stem, the combination including a casing, a reciprocably movable stem guided within a portion of said casing, a transversely extending shaft threaded at one end, actuating means therefor, the said shaft having opposing shoulders formed on the other end, a threaded block engaging the threaded end of said shaft for axial movement thereon, a housing for the actuating means mounted on the shaft around the shoulders formed thereon, a yoke for support of the housing, a crosshead member secured to said stem, a pair of link members pivotally journaled on said threaded block and housing and in pivotal engagement with the crosshead member, a pair of arms journaled on said block and said housing and pivotally suspended from the said yoke, the said actuating means being secured to the unthreaded end of said shaft in cooperation with the said housing, the arms suspended from said yoke supporting the said housing and shaft.

3. In a valve, the combination with a valve casing and a reciprocably movable valve stem guided within a portion of said casing, a yoke attached to the casing, a toggle mechanism comprising a transversely extending shaft threaded at one end, said shaft being rotatably mounted within a pair of spaced-apart members comprising a block member and a housing positioned in substantially the same plane, the said block member being threaded to cooperate with the threaded portion of said shaft, a crosshead on the valve stem, the housing being arranged relative to the opposite end of said shaft so as to permit rotation thereof but inhibiting relative axial movement between the said shaft and said housing, link members pivotally journaled on said block and housing in pivotal engagement with the said crosshead, other link members journaled on said block and pivotally mounted on said yoke, actuating means mounted upon the said housing, the said housing being supported from below by the said first named link members and from above by the said yoke in cooperation with the latter named link members to support the transversely extending shaft therebetween.

4. A toggle-operated actuating device comprising in combination a casing having a stem reciprocably guided therein, means of rotation, a yoke for the support of said rotating means, a transversely extending rotatable shaft threaded at an end portion and adapted to be connected to said means of rotation, a housing for said means of rotation, an apertured block at the threaded end of the said shaft, the said shaft being rotatably mounted within said apertured block and the said housing, the said block being threaded to cooperate with said threaded portion of said shaft, the said housing being mounted about the opposite end portion of said shaft so as to permit relative rotation but to restrain relative axial movement between said shaft and said housing, a crosshead member secured to said stem, toggle arms journaled on said block and said housing and in pivotal engagement with the crosshead member, other toggle arms journaled on the said block and housing and pivotally mounted on the said yoke, means on the said crosshead member engageable with the said yoke for holding the reciprocably movable stem against rotation.

5. In a valve, the combination with a valve casing having a reciprocable stem slidable therewithin, of a toggle mechanism comprising a substantially horizontal rotatable shaft, actuating means for said shaft, a housing for receiving a portion of said shaft, a yoke for the support of the toggle mechanism, a block member mounted in cooperative relation with said rotatable shaft, the said block member threadedly cooperating with said shaft so that rotation of the said shaft causes axial movement of the said block, the said housing serving as the journaling means for the shaft and being axially immovable relative to said shaft, toggle arms pivotally mounted on the said block and housing and in pivotal engagement with means rigid with said reciprocable stem, other toggle arms pivotally mounted on said block and housing and said yoke, the said actuating means being supported by said housing and comprising combined manual and motor driven means directly mounted on the said shaft to rotate the said latter member.

6. In a valve or the like, the combination with a casing having a reciprocably movable member slidable therewithin, of a toggle mechanism comprising a partly threaded shaft positioned transversely to the said reciprocably movable member, a yoke for support of the toggle mechanism, a block member axially movable relative to said shaft when the latter member is rotated, a housing around an end portion of the shaft, the said housing being axially immovable with respect to said transverse shaft when the latter is rotated, toggle arms pivotally journaled on said block member and housing and in pivotal engagement with means rigid with said reciprocably movable member, other toggle arms journaled on said block member and housing and pivotally mounted on said yoke, the end limits of the said shaft having an unthreaded portion journaled within the said housing, actuating means for the said shaft including planetary gears and an orbit gear surrounding a portion of the said shaft, the orbit gear being non-rotatably mounted relative to the said partly threaded shaft.

7. In a valve, the combination with a valve casing having a reciprocable stem slidable therewithin, of a toggle mechanism comprising a substantailly horizontal rotatable shaft, actuating means for said shaft, a housing enclosing an intermediate portion of said shaft, a yoke for the support of the toggle mechanism, a block member mounted in cooperative relation with said rotatable shaft, the said block member threadedly cooperating with a partly threaded portion of the said shaft so that rotation of the said shaft causes axial movement of the said block member, the latter member carrying stop means for limiting its axial movement relative to the said housing, the latter housing serving as the journaling means for an unthreaded portion of the said shaft and being axially immovable relative to the said shaft, toggle arms pivotally mounted on said block and housing and in pivotal engagement with means fixed to the said reciprocable stem, other toggle arms pivotally mounted on the said block and housing and said yoke, the said actuating means being supported by the said housing.

8. In a toggle actuated mechanism, supporting means therefor, a reciprocably movable stem actuated by the said toggle mechanism, crosshead means cooperating with the said stem, the said toggle mechanism including upper and lower toggle arms having lower end portions pivotally connected to the crosshead of said reciprocably movable stem, the upper ends of certain of said toggle arms being supported by the said toggle mechanism supporting means, actuating means including a horizontally disposed partly threaded toggle stem for the toggle arms, the said toggle stem being rotatable but axially immovable relative to its mounting, an end housing for journally receiving the said toggle stem, spaced-apart bearing means mounted in a relieved portion of the said end housing for supporting an unthreaded portion of the said toggle stem, a threaded block member for receiving a threaded portion of the said toggle stem, the lower ends of the toggle arms supported by the said toggle mechanism supporting means and the upper ends of the toggle arms connected to the said crosshead being pivotally connected to the said block member and said end housing.

EDMOND P. DE CRAENE.
      RICHARD FENNEMA.
      FRANCIS J. CANTALUPO.

REFERENCES CITED

The following references are of record in the file of this patent:

UNITED STATES PATENTS

| Number | Name | Date |
| --- | --- | --- |
| 161,751 | Butterworth | Apr. 6, 1875 |
| 512,844 | Simon | Jan. 16, 1894 |
| 1,547,172 | Knauf | July 28, 1925 |
| 1,713,402 | Shivers | May 14, 1929 |
| 2,344,594 | Bryant | Mar. 21, 1944 |
| 2,354,987 | Fawkes | Aug. 1, 1944 |